United States Patent [19]
Barr et al.

[11] 3,880,565
[45] Apr. 29, 1975

[54] TWIN CLAMP UNIT FOR BLOW MOLDING MACHINE

[75] Inventors: Robert A. Barr, Warren; John W. Reed, Mountainside, both of N.J.

[73] Assignee: Hoover Ball and Bearing Company, Saline, Mich.

[22] Filed: Apr. 22, 1974

[21] Appl. No.: 462,810

[52] U.S. Cl. .... 425/150; 425/DIG. 205; 425/450.1; 425/342
[51] Int. Cl. .............................................. B29c 1/16
[58] Field of Search .......... 425/233, 234, 340, 343, 425/450 R, 338, DIG. 205

[56] References Cited
UNITED STATES PATENTS

| | | | |
|---|---|---|---|
| 3,068,511 | 12/1962 | Ahlbeck et al. | 425/DIG. 205 |
| 3,480,993 | 12/1969 | Schjeldahl et al. | 425/249 X |
| 3,484,897 | 12/1969 | Kovacs | 425/167 |

Primary Examiner—Robert D. Baldwin
Assistant Examiner—David S. Safran
Attorney, Agent, or Firm—Olsen and Stephenson

[57] ABSTRACT

A twin clamp unit for a blow molding machine which has hydraulic cylinder means for alternately opening and closing first and second pairs of platens on which mold sections are mounted. The hydraulic cylinder means are arranged so that closing action of the platens occurs only by application of hydraulic fluid to the head ends of the cylinders and opening of the platens occurs only by application of hydraulic fluid to the rod ends of the cylinders, thereby providing maximum pressure application of the clamp units relative to the floor space required for the clamp units. The apparatus also has synchronizing means for closing the platens of each clamp so that they reach the desired closed position at the same time. Adjustment means are also provided for selectively establishing the location of the desired closed position for each of the pairs of platens.

6 Claims, 10 Drawing Figures

TWIN CLAMP UNIT FOR BLOW MOLDING MACHINE

BACKGROUND OF THE INVENTION

The present invention relates to clamp units for a blow molding machine, and particularly to improvements in twin clamp units adapted for use with an extruder that has twin die heads.

It is common in the blow molding art for one extruder to feed a plurality of die heads and thus produce a corresponding number of extruded parisons. In blow molding relatively large articles, the press structure is constructed to exert and withstand substantial forces exerted pneumatically in expanding and shaping the extruded material into conformity with the cavities within the mold sections, and to provide sufficient platen movement to allow passage of molded articles from between mold sections after they have been separated. A conventional press or clamp will comprise end frames connected by parallel tie rods, a pair of platens relatively moveable lengthwise of the tie rods, hydraulic cylinders supported on the outward faces of the end frames for moving the platens, and mold sections carried by the opposing faces of the platens. When high production rates are required, a single screw-type extruder may serve more than one parison-forming die head. The absolute minimum floor space for a press in the direction of motion of the platens is the open position clearance plus the dimension of platen thickness. In a direct in-line hydraulic clamp, the stroke of the cylinder must be added to this dimension. In a single clamp unit, all of the actuating cylinders can be placed on one end frame of the press. The cylinder rods for the far side platen must then pass through the near side platen. To close the press the fluid is ported through the head end of the near side cylinder and the rod end of the far side cylinder. This arrangement can also be used for a twin clamp press merely by duplicating the arrangement at the second end frame. An arrangement such as this is taught in the prior U.S. Pat. No. 3,484,897, issued Dec. 23, 1969 to Kovacs. Twin clamps of this nature are faced with certain inherent problems. When using apparatus of the type shown in this patent, to close either clamp requires a difference in hydraulic fluid flow to the clamp cylinders, because the rod-end volume is less than the head-end volume. Also, the clamp pressure that can be exerted is dictated by the rod-end cylinder area so that a positive mechanical stop is required on the near side platen or it will override the far side platen. To ensure a uniform close, flow control valves are required on the clamp unit so that the fluids flowing to the cylinders can be adjusted for uniform closing. This presents problems in adjustment and requires frequent readjustment as the oil temperature and other operating conditions vary. Thus, there is a need for an improved alternating twin clamp unit for a blow molding machine which will reduce operating problems and also which will give relatively greater clamping pressure with respect to the floor space required for the clamp unit.

SUMMARY OF THE INVENTION

The present invention has overcome the inadequacies of the prior art as it relates to twin clamps for blow molding machines. In the present invention, the platens are closed by applying hydraulic fluid to the head end of all cylinders. This is accomplished by using a hydraulic cylinder mounted on one end frame to actuate the inner platen of the opposite clamp.

In this arrangement, the rod is passed from that hydraulic cylinder through the pair of platens adjacent or nearest to the one end frame to fixed engagement with the inner platen of the opposite clamp. This arrangement relative to certain of the hydraulic cylinders is used with respect to all four platens and assures that closing action is always the result of applying the hydraulic fluid to the head ends only of the cylinders, and opening of the platens is always carried out by applying the hydraulic fluid to the rod ends of the cylinders. This novel arrangement provides important features. For the same cylinder size as that of the prior art structures, the clamp pressure that can be exerted by the present invention is significantly greater because it is dependent only on the head end area. Also, because the oil volumes to the cylinders that are activated to close or open each platen of a clamp are equal, the balancing of the flow of hydraulic fluid for exact synchronization of the platens of each pair is simplified.

To further ensure an accurate uniform closing, the present invention also incorporates a hydraulic equalizer system. Not only does the hydraulic equalizer system ensure uniform closing, but it also includes means to change the normal close-position of the platens if it is desired to have the platens close off-center from the location of their normal closed positions.

Thus, it is among the objects of the present invention to provide improvements in twin blow molding clamp units that will overcome inadequacies existing in the prior art.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the illustrated embodiment of the present invention will be described in greater detail. The twin clamp unit 10 has a first end frame 12 and a second end frame 14 which are mounted in parallel spaced relationship and are interconnected by means of a plurality of tie rods 16 which are connected to and extend between the end frames 12 and 14. In the illustrated embodiment of the invention a center support 18 is located midway between the end frames 12 and 14 and provides additional support for the tie rods 16. Conventional jack apparatus 20 is provided at each end frame 12 and 14 for adjustment purposes, and the details of this apparatus will not be described because the apparatus is conventional.

Figure 6:
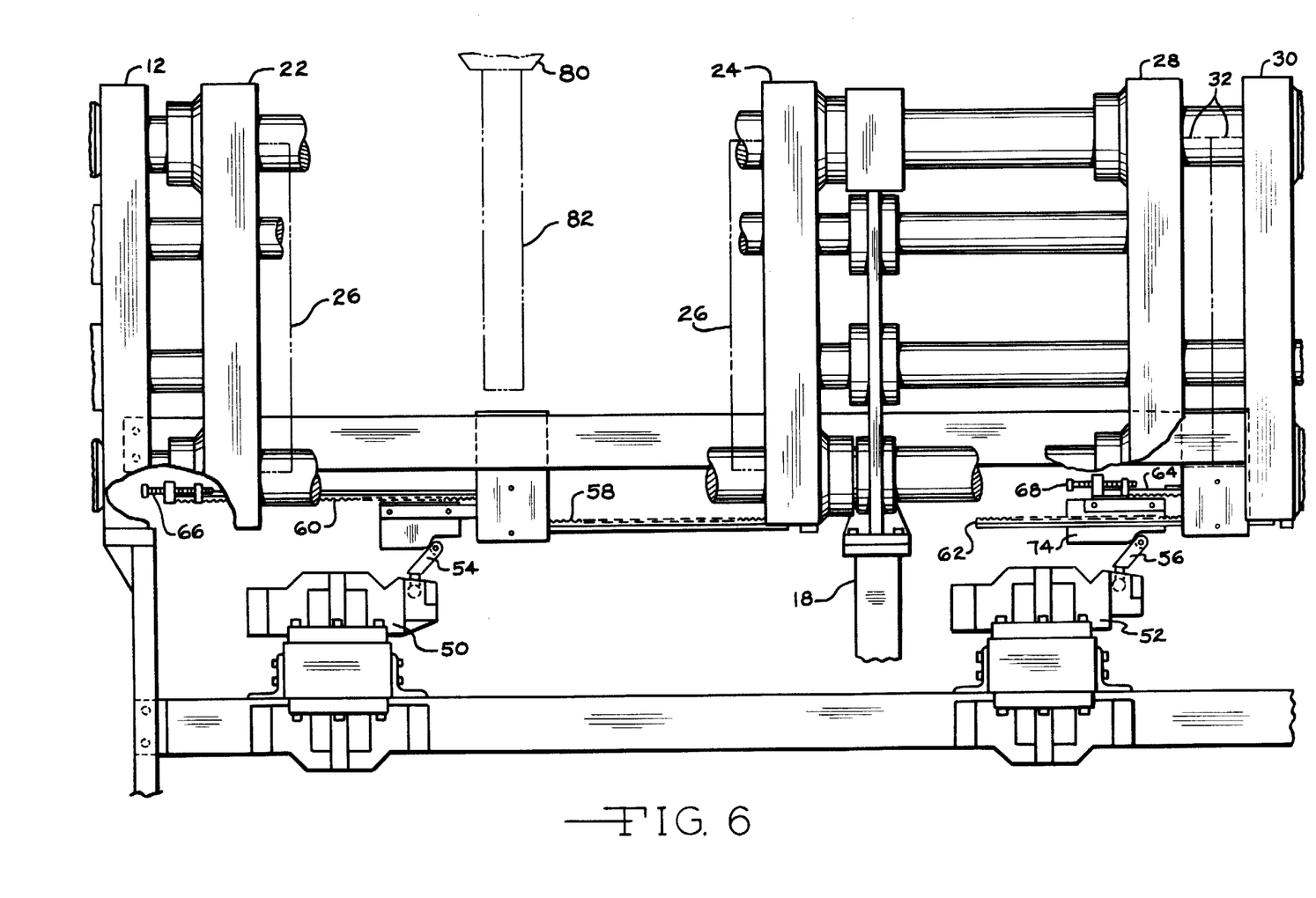
FIG. 6 is an enlarged elevational view with portions broken away for illustration purposes showing mold sections and an extruded parison in phantom lines and illustrating details of the hydraulic fluid equalizing system.

The first pair of opposed platens 22 and 24 are mounted in slidable relation on the tie rods 16 adjacent or nearest to the first end frame 12 and are adapted to carry a first pair of mold sections 26, such as are shown in phantom in FIG. 6, on the sides of the platens 22 and 24 facing each other. A second pair of opposed platens 28 and 30 are mounted in slidable relation on the tie rods 16 adjacent or nearest to the second end frame 14, and they are likewise adapted to carry a second pair of mold sections 32, as shown in phantom in FIG. 6, on the sides of the platens facing each other.

Figure 1:
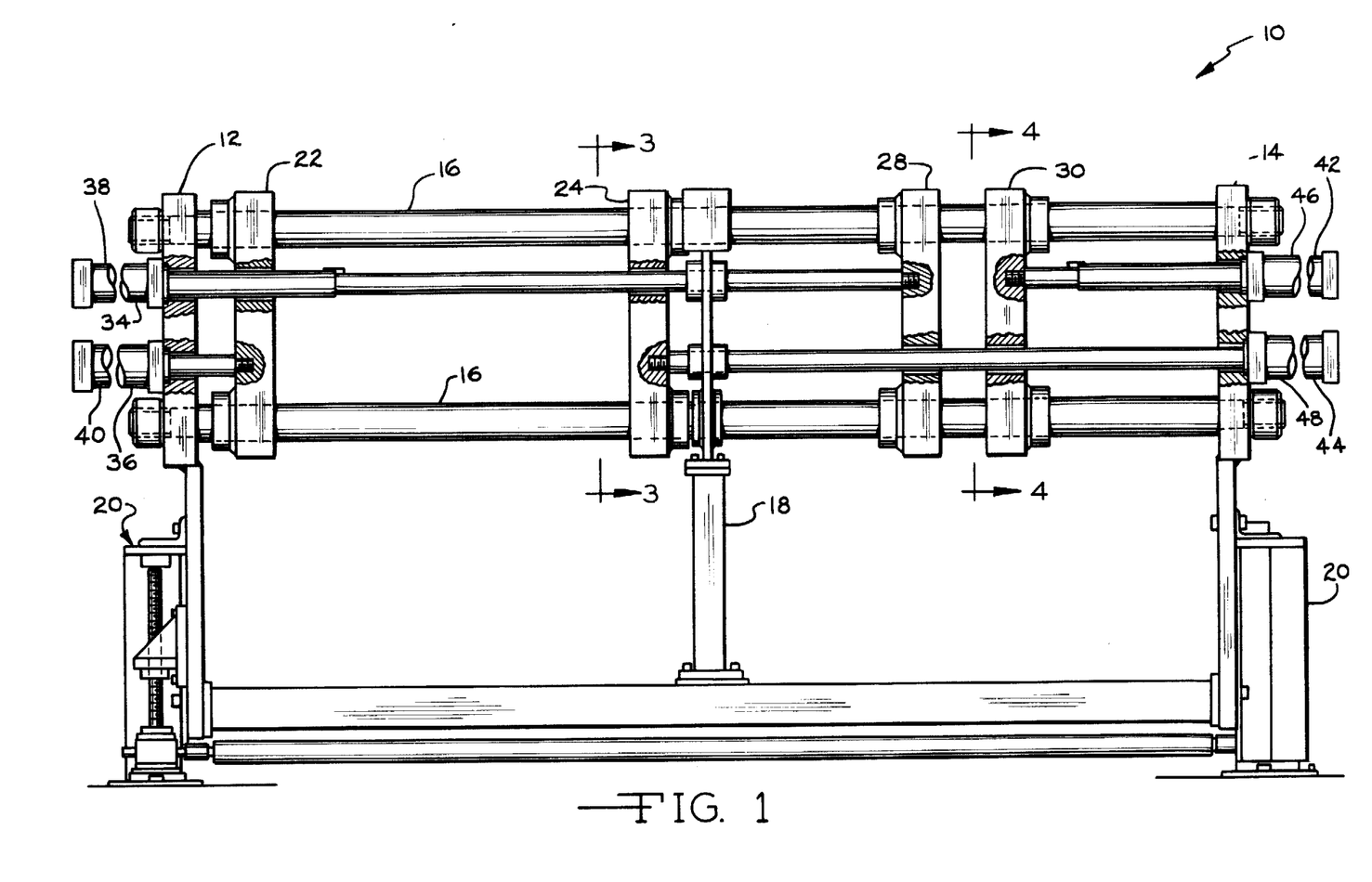
FIG. 1 is a front elevational view of a twin clamp unit embodying one form of the present invention as seen in the direction of the arrows 1—1 in FIG. 2.
Figure 2:
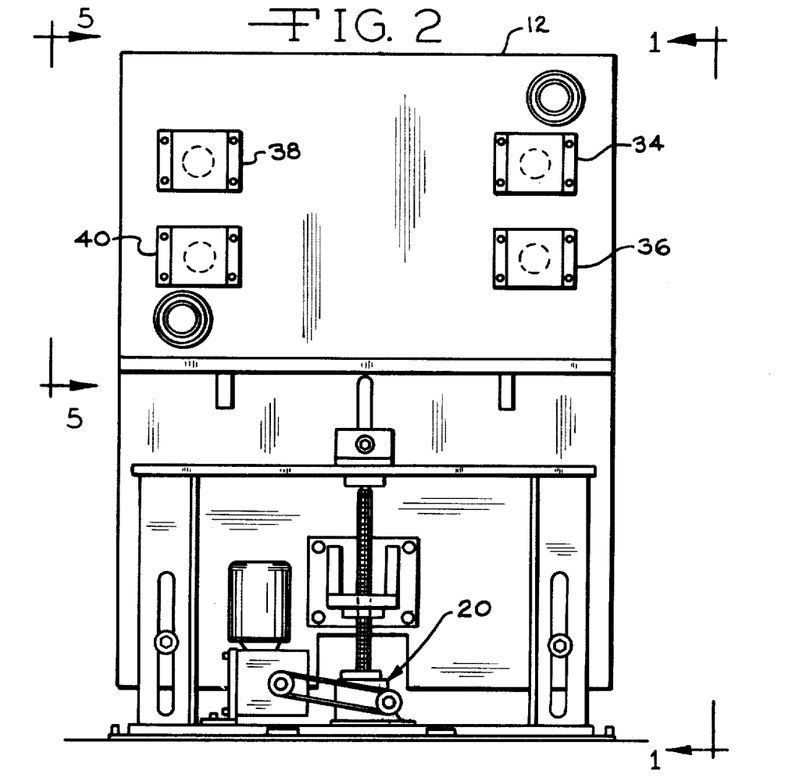
FIG. 2 is a side elevational view of the twin clamp unit as viewed from the left of FIG. 1.
Figures 3, 4:
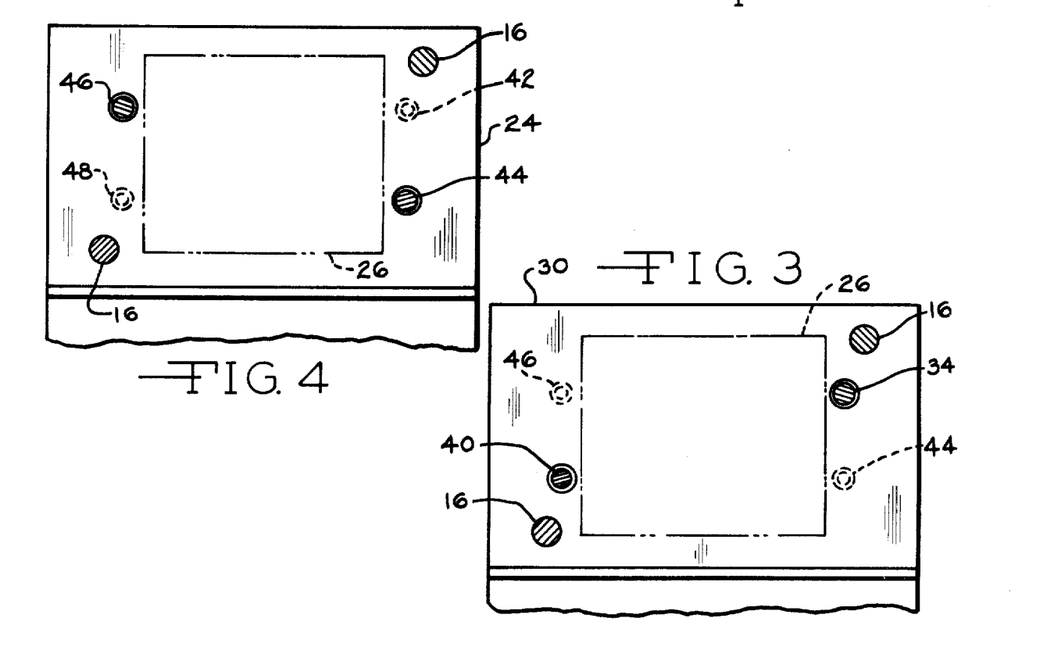
FIG. 3 is a fragmentary section taken on the lines 3—3 of FIG. 1.
FIG. 4 is a fragmentary section taken on the lines 4—4 of FIG. 1.
Figure 5:
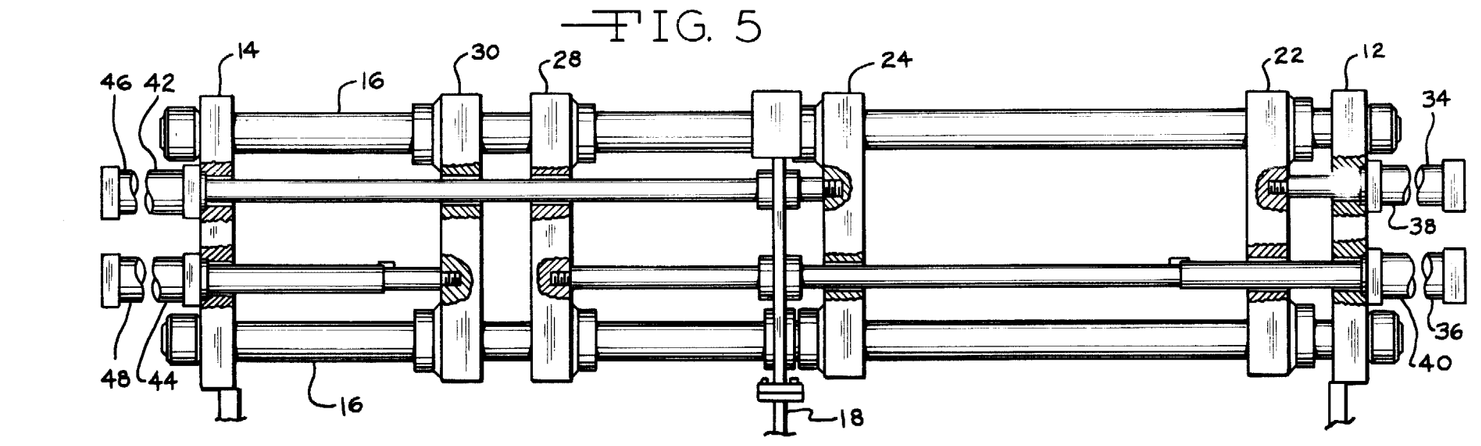
FIG. 5 is a fragmentary elevational view as viewed in the direction of the arrows 5—5 of FIG. 2.

The platens 22, 24, 28, and 30 are adapted to be moved alternately to the open and closed positions shown respectively in FIG. 1 of the first pair of platens 22 and 24 and the second pair of platens 28 and 30. For the purpose of moving the platens between their open and closed positions, four fluid piston-and-cylinder assemblies are mounted on the outer face of the one or first end frame 12 and four similar piston-and-cylinder assemblies are mounted on the outer face of the other or second end frame 14. Mounted on the first end frame 12 are the fluid piston-and-cylinder assemblies 34, 36, 38, and 40. Similarly mounted on the outer face of the end frame 14 are the piston-and-cylinder assemblies 42, 44, 46, and 48.

First coextensive fluid piston-and-cylinder assemblies 36 and 38 are mounted on the first end frame 12 and have the piston rods thereof connected to the nearest platen 22, and the second coextensive fluid piston-and-cylinder assemblies 44 and 46 are mounted on the second end frame 14 and have the piston rods thereof connected to the platen 30 which is the nearest of the second pair of platens. A third coextensive fluid piston-and-cylinder assemblies 34 and 40 are mounted on the first end frame 12 and have the piston rods thereof extending through said first pair of platens 22 and 24 for free movement relative thereto and have their ends connected to the nearest platen 28 of the second pair of platens 28, 30. Similarly, fourth coextensive fluid piston-and-cylinder assemblies 42 and 48 are mounted on the second end frame 14 and have the piston rods thereof extending through the second pair of platens 28, 30 for free movement relative thereto and are connected to the nearest platen 24 of the first pair of platens 22, 24. It will be observed that the piston-and-cylinder assemblies are arranged so that the platen to which each is connected by its piston rod will be moved to a closed position only by application of fluid to the head end of the cylinder. The eight piston-and-cylinder assemblies are double acting, and the piston assemblies are operable to open the pairs of platens only by application of fluid to the rod ends of the cylinders. Thus, when applying hydraulic fluid to close a pair of platens, an equal volume of fluid will be transmitted to the cylinders at each end of the pair of platens for the purpose of closing them so that synchronization is greatly simplified. Similarly, the quantity of hydraulic fluid necessary to flow to each of the hydraulic cylinders for the purpose of opening a pair of platens will also be identically the same. This is because the head ends of the cylinders have equal volumes and are used exclusively for closing the platens and the rod ends of the cylinders have equal volumes and are used exclusively for opening the platens. This arrangement has another distinct advantage in that it enables the maximum pressure to be exerted during the closing of the platens because of the greater effective area of the pistons at the head end of the hydraulic piston-and-cylinder assemblies distinguished from the effective area at the rod ends of the piston-and-cylinder assemblies.

Figure 7:
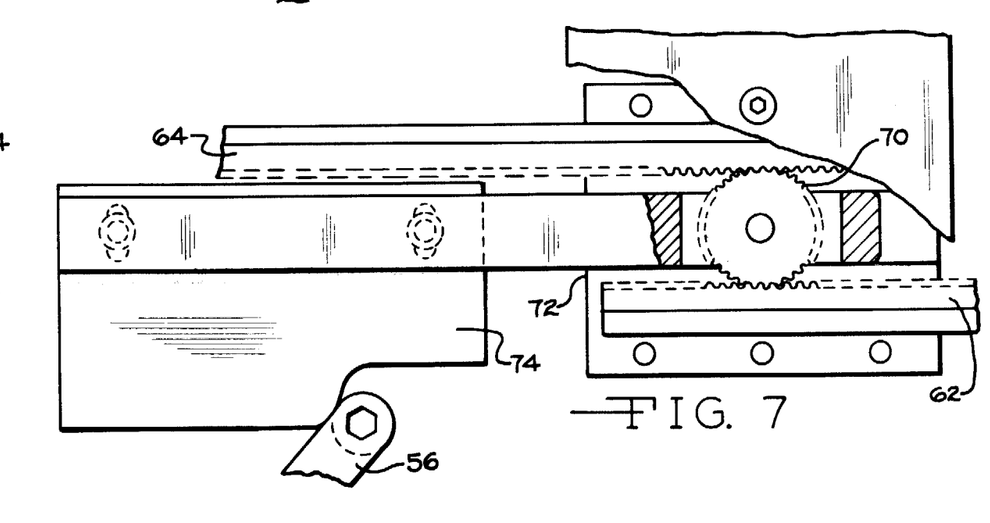
FIG. 7 is an enlarged fragmentary section of a detail of the equalizing system.
Figure 8:
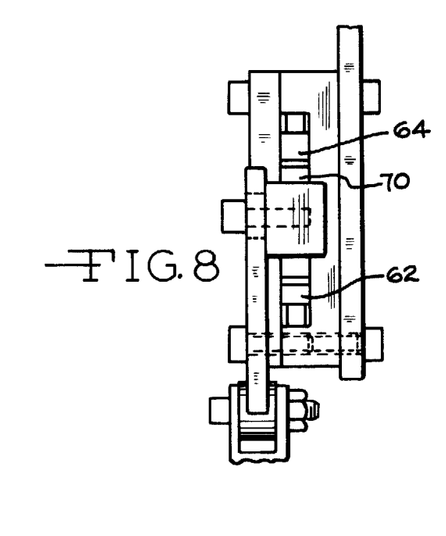
FIG. 8 is an end elevational view of the detail illustrated in FIG. 7.

Attention is next directed to FIGS. 6, 7, and 8 for a description of a portion of the equalizer system provided to ensure further accuracy in uniform closing of the platens. Forming a part of the hydraulic system which will be described hereinafter is a first equalizer valve 50 which is operable in connection with the first pair of platens 22 and 24, and a second equalizer valve 52 which is operable in connection with the second pair of platens 28 and 30. Valve 50 is actuated by the cam follower 54 and valve 52 is actuated by the cam follower 56.

Mounted for movement with the platen 24 is the fixed rack 58 and mounted for movement with the platent 22 is the adjustable rack 60. Similarly mounted for movement with the platen 30 is the fixed rack 62 and adjustably mounted for movement with the platen 28 is the adjustable rack 64. The racks 60 and 64 can be adjusted relative to their associated platens 22 and 28 by the adjustment screws 66 and 68. As shown in FIG. 7 the racks 62 and 64 are in mesh with a pinion gear 70 which is mounted for rotation in the body 72. By virtue of this arrangement it can be seen that as the platens 28 and 30 close, the rack movements are coordinated by the gear 70. If one rack, or its platen, moves faster than the other rack, the gear 70 must also move in that direction. The gear 70 is mounted for movement with the cam 74, which, if it moves, will change the position of the spool in the equalizer valve 52 to alter the flow of the hydraulic fluid to the piston-and-cylinder assemblies associated with closing the platens 28 and 30. As will be explained further in describing the hydraulic circuit with respect to FIGS. 9A and 9B, altering the flow of the hydraulic fluid will balance the platen movement.

In addition to ensuring a uniform close, the equalizer mechanism used in conjunction with the first and second pairs of platens has an added feature. As previously indicated, the adjustment screws 66 and 68 can be turned to change the position of the racks 60 and 62 relative to their platens 22 and 28, if it is desired to have an off-center flow.

Figure 9A:
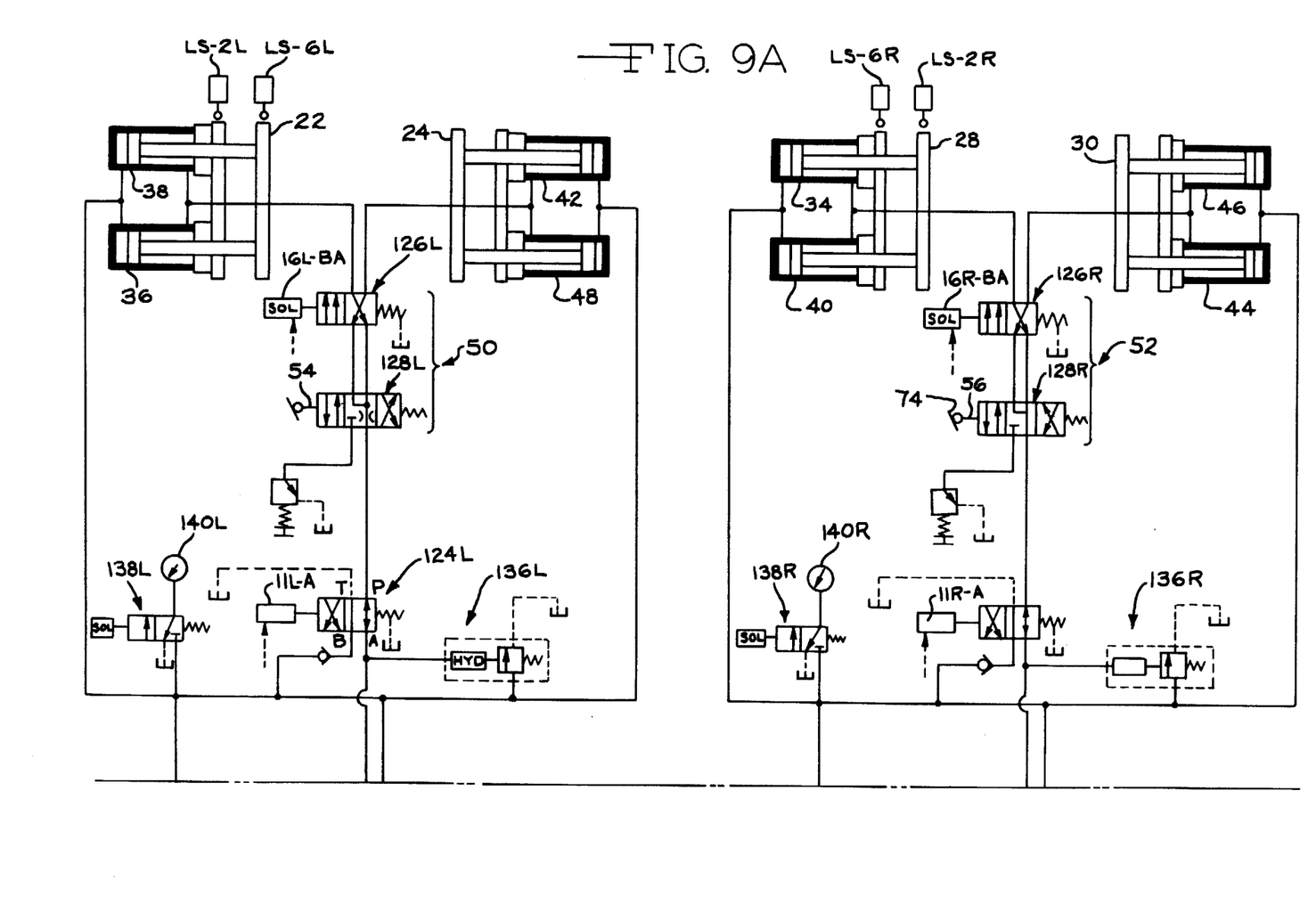
FIGS. 9A and 9B are a schematic diagram of the hydraulic system of the blow molding machine including the hydraulic fluid supply means, fluid conducting means, and control means.
Figure 9B:
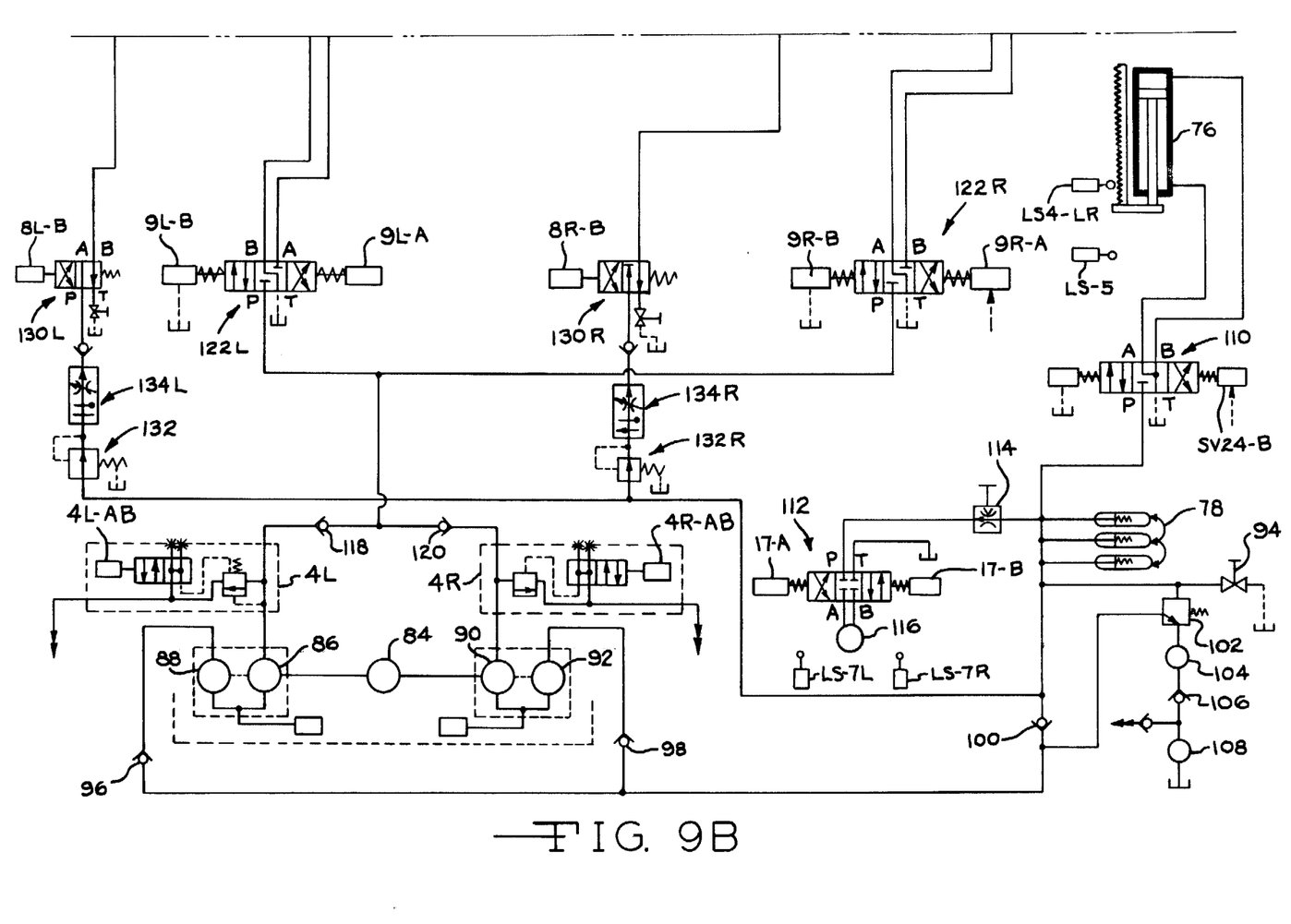

Attention is next directed to FIGS. 9A and 9B for a description of the fluid supply means, the fluid connecting means which interconnect the fluid supply means, and the control means associated with the conducting means for circulating fluid between the piston-and-cylinder assemblies to produce simultaneously movement of the platens of each of the first and second pairs 22, 24 and 28, 30 in opposite directions toward open and closed positions.

The operation will be described with respect to a blow molding machine that is of the type that has a plastic melt accumulator and employs an accumulator hydraulic cylinder 76, which in conjunction with the accumulator bank 78, is used to discharge plastic melt through a die head 80 to form a plastic parison 82 as is shown in phantom in FIG. 6. The fluid supply means includes the hydraulic pump apparatus comprising the electric pump motor 84 with the left shaft end pump 86, the left head end pump 88, the right shaft end pump 90, and the right head end pump 92.

For the purpose of description, it is to be assumed that plastic melt is in the screw-extruder (not shown), up to temperature, ready to run. The clamp units are open against limit switches LS–2L (LS–2R). Plastic melt accumulator is forward against limit switch LS–5. All solenoids are deenergized. All valves are in neutral or reset position. The accumulator drain valve 94 is closed. The accumulators 78 are precharged to approximately 1,500 PSI with nitrogen.

The hydraulic pump motor 84 is now started in a conventional manner, and shaft end pump 86 lifts oil and bypasses it through valve 4L to tank, and shaft end pump 90 similarly lifts oil and bypasses it through valve 4R to tank. Head end pumps 88 and 92 lift oil and deliver through check valves 96 and 98 and check valve 100 into the accumulator bank 78, charging the accumulators.

When the accumulator bank 78 is charged to pressure as set by unloading valve 102, fluid from the accumulator bank 78 feeds back to unloading valve 102, opening this valve. The head end pumps 88 and 92 then bypass to tank via filter 104, check valve 106, and heat exchanger 108.

To initially purge the blow molding machine, the operator will start the extruder drive so that plastic melt is delivered into the melt causing the melt piston to be pushed back. Fluid from the head end of hydraulic cylinder 76 is circulated via valve 110, ports B-T-A to the rod end, until the plastic melt shot-size signal limit switch LS4-LR is operated.

The operator next causes the soldnoid SV17–A (SV17–B) of valve 112 to be energized. Fluid from the accumulator bank 78 then flows through needle valve 114, through valve 112, ports P–A (P–B) thereof, to the Rotac unit 116 which then rotates to LS–7L (LS–7R). The Rotac unit functions to rotate a valve for selecting the die head to which the plastic melt should be directed when discharged to form a parison 82. When limit switch LS–7L (LS–7R) is operated, solenoid SV17–A (LS17–B) is deenergized and valve 112 centers.

The melt accumulator can be purged by pressing a suitable button by energizing solenoid SV24–B. Valve 110 then shifts to connect ports P–B. Oil from the accumulator bank 78 flows to the large area of hydraulic cylinder 76 driving the ram forward, pushing plastic melt through pipes to the die heads to form a parison 82, until the ram empty limit switch LS–5 is operated.

When limit switch LS–5 is operated, solenoid SV24B is deenergized and valve 110 centers. The accumulator bank 78 discharge then stops and pumps 88 and 92 recharge the accumulator bank 78 as before.

For continuous operation the extruder will be running, delivering plastic melt into the melt accumulator, pushing the accumulator ram back. When the ram is back, it will operate limit switch LS4L (LS–4R) and solenoids 4LAB, 4RAB, 9L–B, and 11L–A are energized. Relief valves 4L and 4R devent to their setting of approximately 750 PSI. Bypass of pumps 86 and 90 stops and they deliver their fluid through check valves 118 and 120 and then to valve 122L. Valve 122L has shifted to connect ports P-A, B–T, and fluid is delivered to the head end of the clamp unit cylinders. Valve 124L shifts to connect ports P–B and fluid from the rod end of the clamp unit cylinders passes through equalizer valves 126L and 128L, ports P–B of valve 124L and back to the head end of the clamp unit cylinders. The platens close at high speed until preclose limit switch LS–6L is operated.

When limit switch LS–6L is operated, solenoids 4LAB, 4RAB, 9L–B and 11LA deenergized, and the pumps 86 and 90 bypass as before, valves 122L and 124L reset, and the motion of the clamp unit stops. Also, solenoid valve SV–24B is energized, valve 110 shifts to connect ports P–B, and the accumulator bank 78 discharges, pushing plastic melt through the die heads, as before, to form a parison, until ram empty limit switch LS–5 is operated.

When ram empty limit switch LS–5 operated, solenoids 4LAB, 4RAB, 9L–B are energized, and the clamp unit closes rapidly as before, to operate limit switch LS–6L.

Limit switch LS–6L is operated and held, and solenoids 4L–AB, 4R–AB, 9L–B and 11L–A are deenergized while solenoid 8L–B is energized and valves 4L and LR bypass as before. Valves 122L and 124L reset. Fluid from the accumulator bank 78 flows through solenoid valve 130L, ports P–B, through reducing valve 132L and at a rate as set by flow control valve 134L, into the head end of the clamp unit cylinders. The clamp unit slow limit switch LS–6L (R) closes and pressure builds up to clamp pressure setting as determined by reducing valve 132L.

The blowing of the parison now occurs and as an incident to the completion of the blowing cycle, solenoid 8L–B is deenergized and valve 130L resets. Thereafter, solenoid 9L–A is energized, and valve 122L shifts to pass fluid ports P–B, solenoids 4LAB and 4RAB energized. The pumps 86 and 90 now deliver fluid rapidly to the clamp unit cylinders, and the solenoid 16LBA is energized so that the equalizer valve 126L reverses its action to "Open" direction. The clamp unit now opens rapidly to limit switch LS–2L. Back pressure opens valve 136L providing additional dumping capacity. The blow article is now removed from the mold sections mounted in the clamp unit.

Solenoid 17B is now energized, and fluid from the accumulator bank 78 flows through needle valve 114 through valve 112 ports P–B and thence to the Rotac unit which rotates to limit switch LS–7R. When this occurs solenoid 17–B is deenergized, and the operation is repeated using the illustrated clamp unit on the right to which corresponding reference numbers have been applied. Valves 138L and 138R function to indicate pressure in the system by pressure gages 140L and 140R.

It is claimed:

1. A molding machine including a twin blow-molding clamp unit comprising spaced first and second end frames, a plurality of tie rods connected to said end frames and extending therebetween, a first pair of opposed platens mounted in slidable relation on said tie rods adjacent to the first end frame and adapted to carry a first pair of mold sections on the sides of the platens facing each other, first coextensive fluid piston-and-cylinder assemblies mounted on said first end frame and having the piston rods thereof connected to the nearest of the platens of said first pair of platens, second coextensive fluid piston-and-cylinder assemblies mounted on said second end frame and having the piston rods thereof connected to the nearest of the platens of said second pair of platens, third coextensive fluid piston-and-cylinder assemblies mounted on said first end frame and having the piston rods thereof extending through said first pair of platens for free movement relative thereto and connected to the nearest of the platens of said second pair of platens, fourth coextensive fluid piston and cylinder assemblies mounted on said second end frame and having the piston rods thereof extending through said second pair of platens for free movement relative thereto and connected to the nearest of the platens of said first pair of platens so that the plurality of piston-and-cylinder assemblies are operable to close the pairs of platens only by application of fluid to the head end of the cylinders, and fluid supply means, fluid conducting means interconnecting said supply means and said assemblies, and control means associated with said conducting means for circulating fluid between said piston-and-cylinder assemblies to produce simultaneously movement of the platens of each of the first and second pairs in opposite directions toward open and closed positions.

2. The molding machine that is defined in claim 1, wherein said piston-and-cylinder assemblies are double acting and are operable to open said pairs of platens only by application of fluid to the rod ends of the cylinder.

3. The molding machine that is defined in claim 1, wherein said fluid conducting means and control means are operable to connect the head ends of said first and second piston-and-cylinder assemblies simultaneously to said supply means and to connect the head ends of said third and fourth piston-and-cylinder assemblies simultaneously to said supply means.

4. The molding machine that is defined in claim 1, wherein said piston-and-cylinder assemblies are double acting and are operable to open said pairs of platens only by application of fluid to the rod ends of the cylinder and said fluid conducting means and said control means are operable to connect the head ends of said first and second piston-and-cylinder assemblies simultaneously to said supply means to close said first pair of opposed platens and to connect the rod ends of said third and fourth piston-and-cylinder assemblies simultaneously to said supply means to open said second pair of opposed platens and thereafter to connect the rod ends of said first and second piston-and-cylinder assemblies simultaneously to said supply means to open said first pair of opposed platens and to connect the head ends of said third and fourth piston-and-cylinder assemblies simultaneously to said supply means to close the second pair of opposed platens.

5. The molding machine that is defined in claim 1, wherein said control means includes equalizer valve means associated with each of said first and second pairs of opposed platens and includes activating means responsive to unequal closing action of the platens of each pair to change the supply of fluid to the associated piston-and-cylinder assemblies so that said platens close equally with respect to a predetermined reference plane.

6. The molding machine that is defined in claim 5, wherein each of said equalizer valve means includes an adjustment means for each of said activating means for selectively setting the location of the predetermined reference plane with respect to which the platens will close.

\* \* \* \* \*